US009187993B2

(12) United States Patent
Schmidt et al.

(10) Patent No.: US 9,187,993 B2
(45) Date of Patent: *Nov. 17, 2015

(54) METHODS OF EMPLOYING AND USING A HYBRID TRANSPONDER SYSTEM FOR LONG-RANGE SENSING AND 3D LOCALIZATON

(75) Inventors: Howard Khan Schmidt, Dhahran (SA); Abdullah Awadh Al-Shehri, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 1065 days.

This patent is subject to a terminal disclaimer.

(21) Appl. No.: 13/093,963

(22) Filed: Apr. 26, 2011

(65) Prior Publication Data
US 2012/0273191 A1 Nov. 1, 2012

(51) Int. Cl.
*G01V 1/00* (2006.01)
*E21B 43/26* (2006.01)
(Continued)

(52) U.S. Cl.
CPC ............... *E21B 43/26* (2013.01); *E21B 47/122* (2013.01)

(58) Field of Classification Search
CPC ......... E21B 43/26; E21B 47/122; E21B 7/06; E21B 23/00; E21B 33/02; E21B 33/138; E21B 47/01; E21B 47/09; E21B 47/011; E21B 47/12; E21B 49/00; E21B 49/10; G01S 1/02; G01S 3/86; G01S 3/8006; G01S 13/825; G01V 1/22; G01V 1/40; G01V 3/30; G01V 11/002; G06K 7/0004; G06K 7/0008; G06K 7/02; G06K 19/0723; G06K 19/06; H04Q 9/00
USPC ............ 166/66, 250.01, 254.2, 255.1, 250.1; 324/338, 339; 340/7.1, 10.1, 572.4, 340/991; 342/428, 457; 367/127, 35; 455/11.1, 90.1, 574; 702/2
See application file for complete search history.

(56) References Cited

U.S. PATENT DOCUMENTS 3,713,148 A 1/1973 Cardullo et al.
3,766,560 A * 10/1973 Bornhorst et al. ............ 342/428
(Continued)

FOREIGN PATENT DOCUMENTS

GB 2478445 A 9/2011
WO WO 03/089757 A1 10/2003
(Continued)

OTHER PUBLICATIONS

PCT International Search Report and Written Opinion, dated May 21, 2013; International Application No. PCT/US2012/034756 International Filing Date: Apr. 24, 2012 (11 pages).
(Continued)

*Primary Examiner* — Daniel L Murphy
(74) *Attorney, Agent, or Firm* — Bracewell & Giuliani LLP; Constance Gall Rhebergen; Christopher L. Drymalla

(57) ABSTRACT

Methods of employing and using a hybrid transponder system to determine the size, extent, and orientation of a hydraulic fracture of a reservoir, are provided. An exemplary method can include the steps of inserting a plurality of transponders into a fluid, injecting the fluid carrying the transponders through casing perforations and at least one fracture aperture in a wellbore and into a hydraulic fracture, actuating each of the transponders by a reader to provide an acoustic return signal to the reader, determining a three-dimensional position of each of the transponders, mapping the location of the each of the transponders, and determining characteristics of the hydraulic fracture responsive to the three-dimensional position of each of the plurality of transponders. The method can be implemented utilizing a reader including an RF transmitter and one or more acoustic receivers along with typically a substantial plurality of transponders each containing an RF receiver and an acoustic transmitter.

25 Claims, 10 Drawing Sheets

(51) Int. Cl.
*E21B 47/12* (2012.01)
*E21B 47/00* (2012.01)

(56) References Cited

U.S. PATENT DOCUMENTS

| | | | |
|---|---|---|---|
| 3,790,930 | A | 2/1974 | Lamel et al. |
| 4,445,580 | A | 5/1984 | Sahley |
| 4,742,357 | A | 5/1988 | Rackley |
| 5,228,011 | A | 7/1993 | Owen |
| 5,747,750 | A | 5/1998 | Bailey et al. |
| 5,940,346 | A | 8/1999 | Sadowsky et al. |
| 6,108,555 | A | 8/2000 | Maloney et al. |
| 6,154,137 | A | 11/2000 | Goff et al. |
| 6,201,499 | B1 | 3/2001 | Hawkes et al. |
| 6,236,836 | B1 * | 5/2001 | Westman et al. ............... 340/7.1 |
| 6,438,380 | B1 | 8/2002 | Bi et al. |
| 6,590,535 | B1 | 7/2003 | De Champlain et al. |
| 6,633,252 | B2 | 10/2003 | Stolarczyk et al. |
| 6,691,779 | B1 * | 2/2004 | Sezginer et al. ......... 166/250.01 |
| 7,167,715 | B2 | 1/2007 | Stanforth |
| 7,298,327 | B2 | 11/2007 | Dupray et al. |
| 7,403,120 | B2 * | 7/2008 | Duron et al. ............... 340/572.1 |
| 7,455,108 | B2 | 11/2008 | Jenkins et al. |
| 7,495,998 | B1 * | 2/2009 | Deligeorges et al. ......... 367/127 |
| 7,608,478 | B2 | 10/2009 | Gangopadhyay et al. |
| 7,814,988 | B2 | 10/2010 | Peter |
| 8,193,813 | B2 * | 6/2012 | Seydoux et al. ............... 324/338 |
| 2002/0104653 | A1 | 8/2002 | Hosie et al. |
| 2003/0006645 | A1 | 1/2003 | Ueno |
| 2005/0055162 | A1 * | 3/2005 | Gao et al. ......................... 702/2 |
| 2005/0061513 | A1 | 3/2005 | Johansen |
| 2006/0267772 | A1 * | 11/2006 | Knadle et al. ............... 340/572.4 |
| 2008/0170982 | A1 | 7/2008 | Zhang et al. |
| 2008/0316049 | A1 | 12/2008 | Verret |
| 2009/0120637 | A1 | 5/2009 | Kirkwood et al. |
| 2009/0211754 | A1 | 8/2009 | Verret et al. |
| 2009/0301778 | A1 | 12/2009 | Taylor |
| 2010/0066496 | A1 * | 3/2010 | Cho et al. ..................... 340/10.1 |
| 2010/0122813 | A1 * | 5/2010 | Trummer et al. .......... 166/255.1 |
| 2010/0139386 | A1 | 6/2010 | Taylor |
| 2010/0155055 | A1 | 6/2010 | Ash et al. |
| 2010/0242585 | A1 | 9/2010 | Pratyush et al. |
| 2012/0273192 | A1 * | 11/2012 | Schmidt et al. ............ 166/250.1 |
| 2014/0145716 | A1 | 5/2014 | Dirksen et al. |

FOREIGN PATENT DOCUMENTS

| | | | |
|---|---|---|---|
| WO | WO 03089757 | A1 * | 10/2003 |
| WO | WO 2004051304 | A1 * | 6/2004 |

OTHER PUBLICATIONS

PCT International Search Report and Written Opinion, dated May 21, 2013; International Application No. PCT/US2012/034776 International Filing Date: Apr. 24, 2012 (12 pages).
Radio Frequency Identification, Wikipedia, dated Apr. 24, 2011.
Loop antenna, Wikipedia, dated Mar. 27, 2011.
"Reciprocity" Antenna-Theory.com, retrieved at http://www.antenna-theory.com/definitions/reciprocity.php, 2010, 1 page.
Chickos et al. "Vapor Pressures and Vaporization Enthalpies of the n-Alkanes from C21 to C30 at T=298.15 K by Correlation Gas Chromatography" Journal of Chemical and Engineering Data, vol. 49, No. 1, 2004, pp. 77-85.
Final Office Action for co-pending U.S. Appl. No. 13/093,979 dated Nov. 7, 2014.
Office Action for co-pending U.S. Appl. No. 13/093,979 dated Aug. 29, 2013.
Wikipedia "Alkane" retrieved at http:/en.wikipedia.org/wiki/Alkane on Jul. 12, 2014, pp. 1-21.
Wikipedia "Boiling point" retrieved at http://en.wikipedia.org/wiki/Boiling_point on Jul. 12, 2014, pp. 1-7.
Wikipedia "Well logging" retrieved at http://en.wikipedia.org/wiki/Well_logging on Jul. 9, 2014, pp. 1-11.
Wikipedia "Loop Antenna" retrieved at http://en.wikipedia.org/wiki/Loop_antenna, dated Mar. 27, 2011, 7 pages.
Wikipedia "Radio Frequency Identification" retrieved at http://en.wikipedia.org/wiki/Radio-frequency_identification, dated Apr. 24, 2011, 30 pages.
Partial European Search Report for EP Application No. 14172620.8 (SA5343EP) dated Mar. 6, 2015.

* cited by examiner

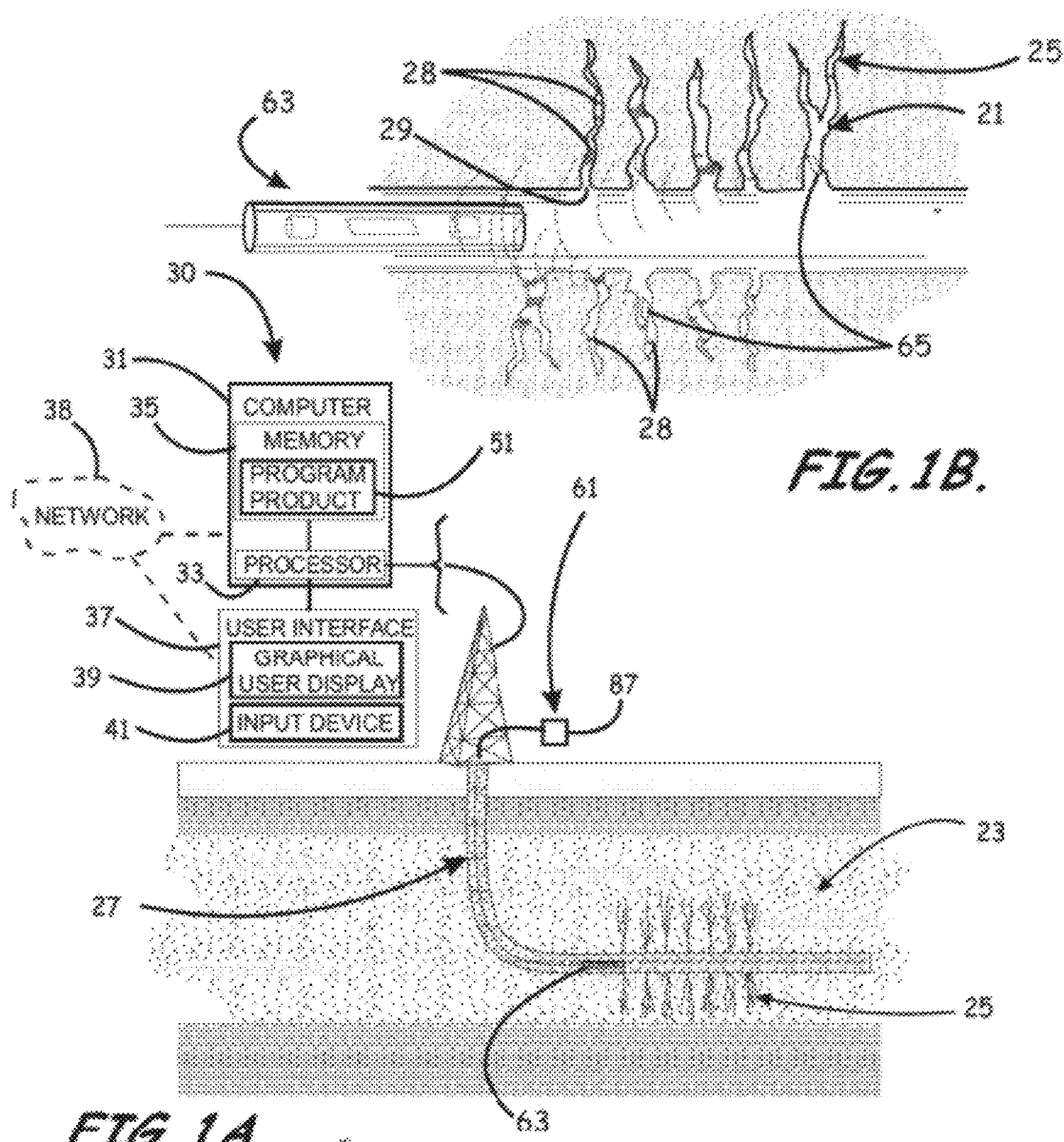
FIG.1B.
FIG.1A.
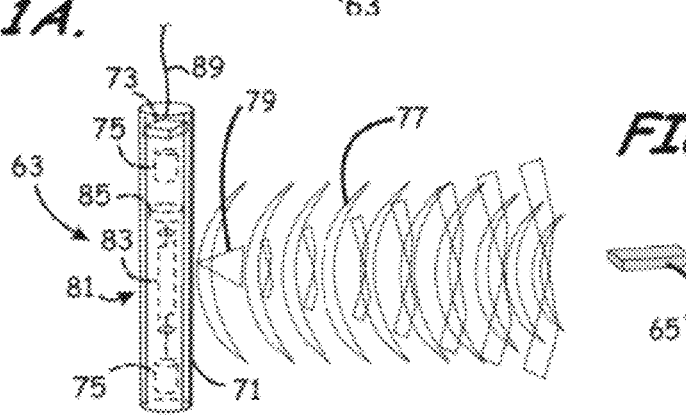
FIG.1C.

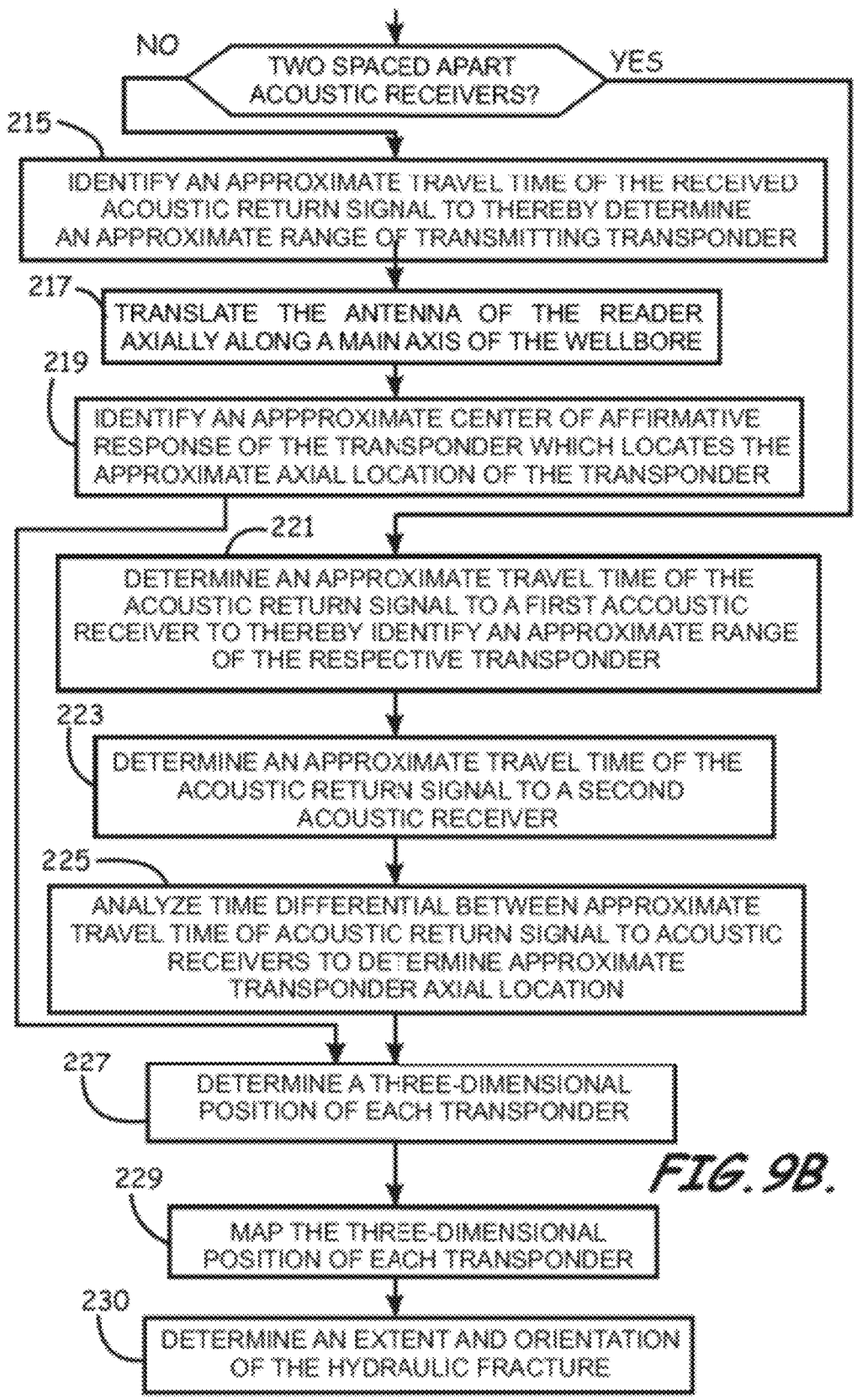

METHODS OF EMPLOYING AND USING A HYBRID TRANSPONDER SYSTEM FOR LONG-RANGE SENSING AND 3D LOCALIZATON

RELATED APPLICATIONS

This application is related to U.S. patent application Ser. No. 13/093,979, filed on Apr. 26, 2011, titled "HYBRID TRANSPONDER SYSTEM FOR LONG-RANGE SENSING AND 3D LOCALIZATION," incorporated by reference in its entirety.

BACKGROUND OF THE INVENTION

1. Field of the Invention

The present invention relates in general to the field of hydrocarbon production, and in particular, to methods related to mapping the size and shape of hydraulic fractures in hydrocarbon reservoirs.

2. Description of the Related Art

Hydraulic fractures are frequently employed to improve reservoir contact and production rates in the oil and gas industry. Hydraulic fracturing has been used for over 60 years in more than one million wells. Hydraulic fracture stimulation is commonly applied to wells drilled in low permeability reservoirs. An estimated 90% of the natural gas wells in the United States use hydraulic fracturing to produce gas at economic rates. Successful hydraulic fracturing is generally considered vital for economic production of natural gas from shale beds and other 'tight gas' plays.

A hydraulic fracture is formed by pumping a fluid into the wellbore at a rate sufficient to increase the pressure downhole to a value in excess of the fracture gradient of the formation rock. The pressure causes the formation to crack, allowing the fracturing fluid to enter and extend the crack further into the formation. To keep this fracture open after the injection stops, a solid proppant is added to the fracture fluid. The proppant, which is commonly sieved round sand or other porous material, is carried into the fracture. This sand is chosen to be higher in permeability than the surrounding formation, and the propped hydraulic fracture then becomes a high permeability conduit through which the formation fluids can flow to the well.

Determining the size and orientation of completed hydraulic fractures is quite difficult, expensive, and inaccurate. Accordingly, the inventors have recognized that improved means are sorely needed. Existing methods which employ tiltmeters or microseismic detectors are used despite their limitations because some information, even imperfect information is valuable. Tiltmeter arrays, deployed on the surface or down a well, for example, provide a technology for monitoring the fracture geometry. The tiltmeters measure the horizontal gradient of the vertical displacement with great precision (up to one nanoradian), and an array of tiltmeters properly situated over a reservoir can be used to extract the surface deformation that is taking place because of processes occurring deep underground. With microseismic monitoring microseismic activity is measured by placing an array of geophones in a nearby wellbore or at the surface. By mapping the location of small seismic events that are associated with the growing hydraulic fracture during the fracturing process, the approximate geometry of the fracture can be inferred. The microseismic monitoring relies upon the detection of individual microseismic events associated with discrete fracture opening events, which can be located in three dimensions by triangulation, which is based on comparing acoustic arrival times at various sensors in a receiver array.

The distance that rock faces are separated during a hydraulic fracture is called the fracture width. Practical fracture widths range from about one millimeter up to about one centimeter. The sands, or similar materials, are used to "prop" open hydraulic fractures are, therefore, typically about one millimeter in diameter or less. Accordingly, recognized by the inventors is that there exists some significant physical constraints on mapping devices which would be deployed within a hydraulic fracture. For example, recognized by the inventors is that any transponders to be used for mapping hydraulic fractures and reservoir parameters must be able to physically fit into the fracture, not just adjacent the opening, but deeply therein, and therefore, should not be not more than about one millimeter in at least one dimension, to help ensure passage.

The use of conventional radio-frequency identification (RFID) transponders was explored. RFID is a technology that uses communication via electromagnetic waves to exchange data between a terminal and an object such as a product, animal, or person for the purpose of identification and tracking. Some tags can be read from several meters away and beyond the line of sight of the reader. RFID involves readers (also known as interrogators) and transponders (also known as tags). Most RFID tags contain two primary components. The first is an integrated circuit for storing and processing information, modulating and demodulating a radio-frequency (RF) signal, and other specialized functions. The second is an antenna for receiving and transmitting the signal. There are three types of RFID tags: passive RFID tags, which have no power source and require an external electromagnetic field to initiate a signal transmission; active RFID tags, which contain a battery and can transmit signals once an external source ('Interrogator') has been successfully identified; and battery assisted passive (BAP) RFID tags, which require an external source of sufficient power to "wake up" the tag and have significant higher forward link capability providing a greater range than that of purely passive tags.

In general, the read range of typical passive RFID systems is limited to a few meters. In principal, the antenna size and power of the RF field of the reader can be increased arbitrarily. This will increase the range for transmitting energy to passive tags and will increase the read range somewhat by increasing the sensitivity of the readers' antenna. Recognized by the inventors, however, is that even under ideal conditions, only approximately 30 meters would be achievable. Ideal conditions, however, are seldom the norm. Also recognized by the inventors is that such arbitrary scaling on the transponder side would not generally be possible for tags that would be required to fit through open hydraulic fractures, and thus, would face significant size limitations, especially in applications where the form factor is especially constrained. To fully map hydraulic fractures, a read range on the order of 100 meters or so can be required. Accordingly, recognized by the inventors is the need for methods and systems which provide transponders or tags that are small enough to be deployed through open or opening hydraulic fractures and which have a communication range with a reader-interrogator of up to 100 meters or more when deployed within a hydraulic fracture of a reservoir.

SUMMARY OF THE INVENTION

In view of the foregoing, various embodiments of the present invention advantageously provide methods and systems for determining a size, extent, and orientation a hydraulic fracture of a reservoir, conventional and unconventional, which provides transponders or tags that are small enough to be deployed through open or opening hydraulic fractures and which have a communication range with a reader-interrogator of up to 100 meters or more. Various embodiments of the present invention include methods and systems which are employed such that the position of a given transponder can be determined by recording its response (or lack thereof) due to changes in the position and/or orientation of the reader antenna (e.g., having a non-isotropic antenna radiation pattern) performed systematically, recording time-of-arrival of a reader signal transmitted from different locations, analyzing differences in acoustic signal time-of-arrival of a return signal at the reader, and/or by varying the amount of power transmitted by the reader to RFID transponders. Advantageously, such methodologies can exploit the directionality and range of RF power transmitted by the reader to selectively activate, e.g., hybrid RFID transponders based on their physical location.

More specifically, an example of an embodiment of a method of determining a size, extent, and orientation of a hydraulic fracture of a reservoir (conventional and unconventional), includes the steps of inserting a plurality of transponders into a fluid (e.g., typically a liquid containing hydraulic fracturing proppant), injecting the fluid carrying the transponders through casing perforations and at least one fracture aperture in a wellbore and into a hydraulic fracture, actuating each of the transponders by a reader to provide an, e.g., acoustic, return signal to the reader, determining a three-dimensional position of each of the transponders, e.g., with reference to the reader, mapping the location of the each of the transponders, and determining characteristics of the hydraulic fracture responsive to the three-dimensional position of each of the plurality of transponders. The method can be implemented utilizing a reader including an RF transmitter and at least one, but more typically at least a pair of acoustic receivers along with at least one, but more typically a substantial plurality of transponders each containing an RF receiver and an acoustic transmitter, which together form a system useful for mapping the size and shape of natural or hydraulic fractures in a geologic medium.

According to an exemplary configuration, the reader is to be disposed within a wellbore. As such, the dimensions of the reader are such as to allow disposition in the wellbore, which is nominally cylindrical, with an inner diameter ranging from two to eight inches. The position of the reader RF transmitter and acoustic receiver elements of the reader are preferably positioned independent of one another. The RF transmitting antenna is preferably directional and may be both translated axially and rotated radially within the wellbore. Transmitters and receivers include appropriate control, decoder and power supply means. RF fields from the reader can be used to transmit power and/or instructions to the transponders.

Each of the transponders typically contain a passive radiofrequency identification circuit including an RF antenna, and an acoustic transmitter. These "hybrid" transponders are disposed in the fracture, having been placed there by being carried along in a fluid injected into the fracture. As such, the dimensions of each transponder are such as allow disposition within the fracture, typically one millimeter or less in one dimension (thickness) and one to ten centimeters or less along the other dimensions (width and length). Each transponder is preferably built up on a flexible electric circuit substrate to allow traversal within the individual fissures. The transponders may optionally be provided with sensor means to measure reservoir parameters in-situ (e.g. salinity, local dielectric constant, temperature, pressure, etc.). Transponders generate an acoustic signal when powered by the RF field and optionally when instructed to do so. The range and position of a transponder relative to a reader may be determined using triangulation to the acoustic signals received by the reader, adjusting the RF power transmitted from the reader or varying the position or orientation of the RF transmitter, or a combination thereof. The transponders are preferably supplied with an RF demodulator and a digital control circuit allowing the receiver to control a given transponder. Example instructions include entering a quiescent state (do not transmit) and transmitting if a measured value is equal to a certain level. Also, optimal performance of this system can be enhanced by the utilization of battery assistance. A thin film battery, for example, may be added to the transponder without adversely affecting its overall dimensions. The assistance of the battery can advantageously enhance optimal performance of the overall system.

According to an exemplary embodiment of the method, the three dimensional position of a given transponder can be determined from its ability to respond based upon the position and orientation of the reader's RF antenna, as well as the amount of power transmitted, along with the arrival times of its returned acoustic signal at the reader's acoustic receivers. Correspondingly, the reader can be configured so that the power of the reader can be adjusted arbitrarily, and/or the operating frequency of the system can be changed to optimize antenna efficiency and detection range of the transponders. Also, a reflector can be added to the reader antenna to direct the RF energy (and read sensitivity) in one direction, making the response pattern asymmetric.

As such, after placing transponders in the fracture, the reader antenna can be manipulated in space (translation and rotation within the wellbore) and the transmission power can be adjusted to determine the response of each transponder. The vertical/axial location of the transponder can be determined, for example, from the center of affirmative response as the antenna is translated vertically/axially along the wellbore. The radial position (bearing) of the transponder can similarly be determined, for example, by the center of positive response as the antenna is rotated or panned within the wellbore. The distance (range) from the transponder to the wellbore can be determined, for example, from either the radial response pattern or by decreasing the reader transmit power until the transponder fails to return a signal, using a previously calibrated power-range response table or other model.

Conceptually, various embodiments of the present invention advantageously capitalize upon the strengths of RFID tag systems and the strengths of sub-sea transponder/beacon systems to form a hybrid system which overcomes the weaknesses inherent to both systems. Advantageously, various embodiments of the present invention provide methods and systems for mapping the shape of hydraulic fractures within a reservoir, for example, by determining the location of each of a plurality of transponders disposed within the hydraulic fracture. Notably, where conventional approaches for determining the position of RF transponders (e.g. automobile tracking devices and/or cellular telephones, etc.) use relative signal power received at a plurality of receivers, or an RF signal time-of-arrival at the plurality of receivers. Such conventional systems make assumptions including assumptions that the interrogator is fixed in position and orientation, while the transponders may be mobile. Advantageously, embodiments of the present invention include methods and systems which are employed such that the position of a given transponder can be determined by recording its response (or lack thereof) when the position and/or orientation of the reader antenna (e.g., having a non-isotropic antenna radiation pattern) is changed, systematically, and/or by varying the amount of power transmitted by the reader to RFID transponders. Advantageously, such methodologies can exploit the directionality and range of RF power transmitted by the reader to selectively activate, e.g., hybrid, RFID transponders based on their physical location.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 1A is a schematic diagram of the system architecture of a system for determining a size, extent, and orientation of a hydraulic fracture of a reservoir according to an embodiment of the present invention;

FIG. 1B is a schematic diagram of a hybrid reader within a wellbore according to an embodiment of the present invention;

FIG. 1C is a schematic diagram including partial perspective view of a hybrid reader in communication with a hybrid transponder according to an embodiment of the present invention;

FIGS. 9A-9B provide a schematic flow diagram illustrating steps associated with determining a size, extent, and orientation of a hydraulic fracture of a reservoir according to an embodiment of the present invention.

DETAILED DESCRIPTION

Figure 2:
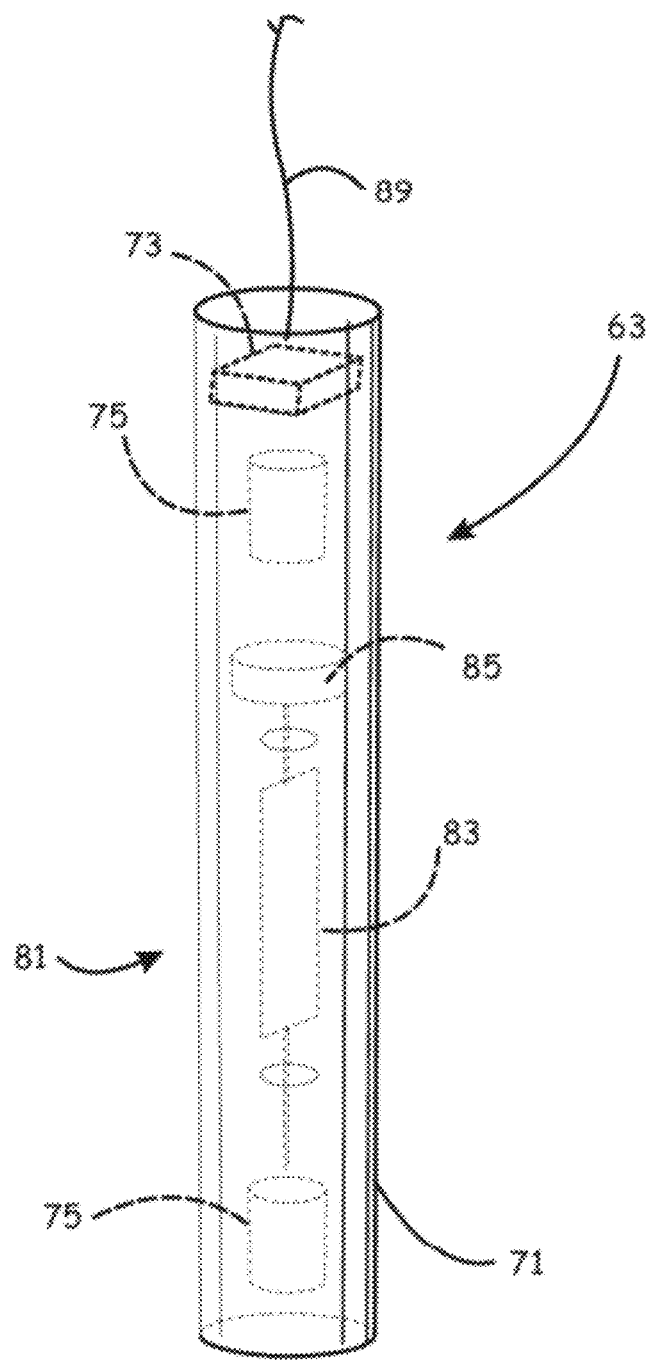
FIG. 2 is a perspective view of a hybrid reader according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Various embodiments of the present invention relate to the use of the principles of radio-frequency identification (RFID) technology to map the shape of hydraulic fractures. The position of one or more transponders can be localized in three dimensions relative to a reader installed in a wellbore. The transponders are carried along in a fluid injected into the hydraulic fracture being examined. After deployment, the three dimensional position of each transponder in relation to the RF antenna of the deployed reader can be determined from its ability to respond to an interrogation signal at certain reader RF antenna positions and orientations, its relative position with respect to acoustic receivers, and/or based upon the amount of RF power required to be transmitted in order to actuate the transponder. The reader or a separate computer can record the transponder's response (or lack thereof) due to changes in the position and/or orientation of the reader's antenna (e.g., having a non-isotropic antenna radiation pattern) performed systematically, record time-of-arrival of an acoustic return signal precipitated by an interrogation signal transmitted from different locations, analyze differences in acoustic signal time-of-arrival of a return signal at the reader, and/or by varying the amount of power transmitted by the reader to transponders. Beneficially, such methodologies can exploit the directionality and range of RF power transmitted by the reader to selectively activate, e.g., hybrid, RFID transponders based on their physical location.

As perhaps best shown in FIGS. 1A-1C, a system 30 for determining a size, extent, and orientation of a hydraulic fracture 21 of a reservoir 23 typically including multiple fissures 25, as known to those skilled in the art, is provided. The system 30 can include a fracture mapping computer 31 having a processor 33, memory 35 coupled to the processor 33 to store software and database records therein, and a user interface 37 which can include a graphical display 39 for displaying graphical images, and a user input device 41 as known to those skilled in the art, to provide a user access to manipulate the software and database records. Note, the computer 31 can be in the form of a personal computer or in the form of a server or server farm serving multiple user interfaces 37 or other configuration known to those skilled in the art. Accordingly, the user interface 37 can be either directly connected to the computer 31 or through a network 38 as known to those skilled in the art.

The system 30 can also include a database (not shown) stored in the memory 35 (internal or external) of fracture mapping computer 31 and having data indicating required signal strength in relation to travel distance such as, for example, in the form of a calibrated power-range response table (not shown). Such data can be provided for a plurality of preselected frequencies in relation to various rock formation types-in situ hydrocarbons, expected to be encountered in a reservoir being analyzed.

Figure 3:
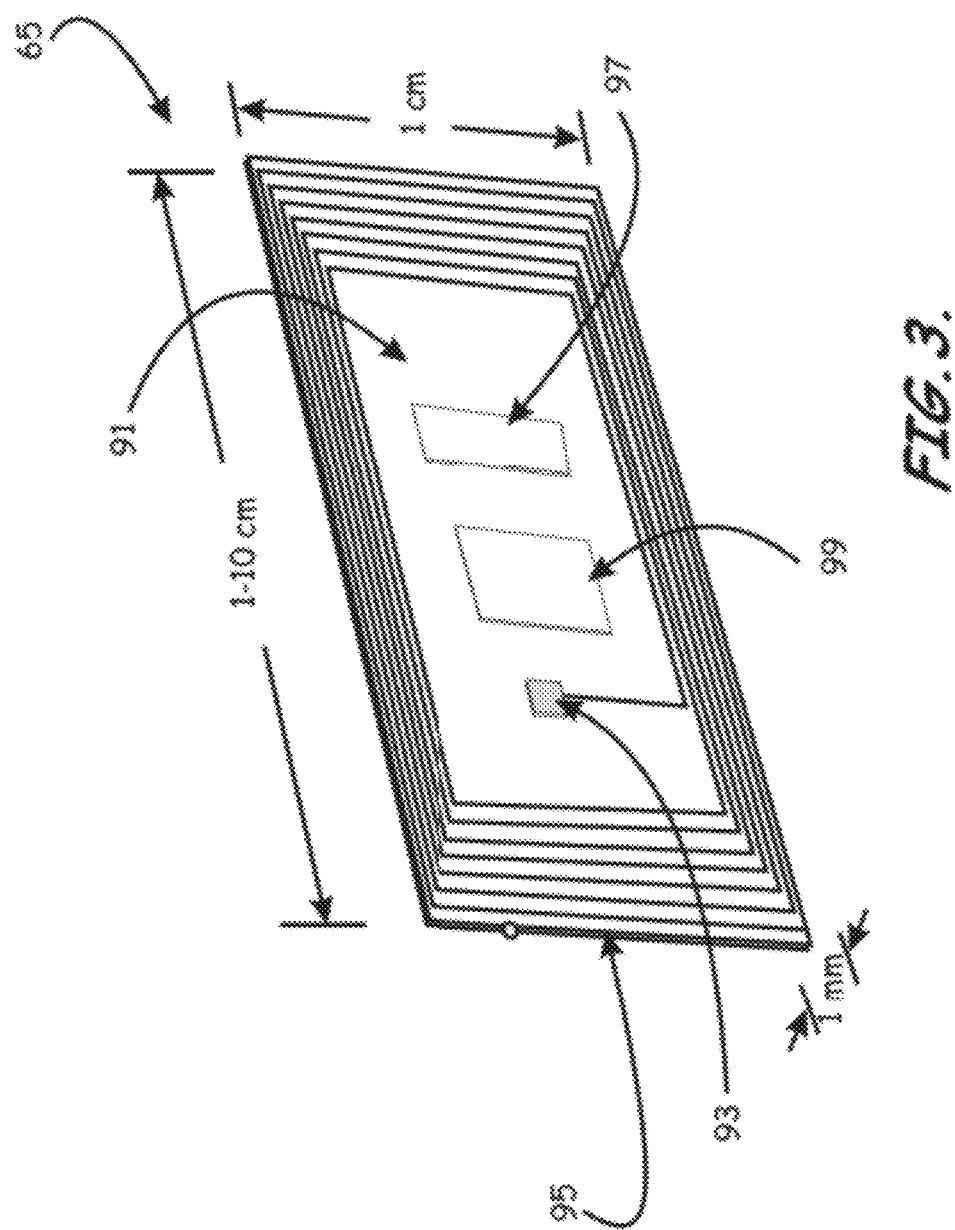
FIG. 3 is a perspective view of a hybrid transponder according to an embodiment of the present invention.

The system 30 can also include fracture mapping program product 51 stored in memory 35 of the fracture mapping computer 31 and adapted to provide control and position signals to a reader deployment assembly 61 (see, e.g., FIG. 1A) and a transponder reader/interrogator 63 (see, e.g., FIG. 2) and to analyze return signals from one or more transponders 65 (see, e.g., FIG. 3). Note, the fracture mapping program product 51 can be in the form of microcode, programs, routines, and symbolic languages that provide a specific set for sets of ordered operations that control the functioning of the hardware and direct its operation, as known and understood by those skilled in the art. Note also, the fracture mapping program product 51, according to an embodiment of the present invention, need not reside in its entirety in volatile memory, but can be selectively loaded, as necessary, according to various methodologies as known and understood by those skilled in the art. Still further, at least portions of the fracture mapping program product 51 can be stored in memory of the reader 63 and/or executed by reader 63.

As shown in FIGS. 2 and 3, the system 30 also includes at least one reader 63 (FIG. 2) and one or more preferably hybrid transponders 65 (FIG. 3). According to an embodiment of the present invention, the reader 63 includes a housing 71 sized and configured to allow placement within the wellbore 27. The housing 71 has a generally cylindrical shape with an outer diameter of less than between 5 cm to 20 cm, depending upon the inner diameter of the wellbore 27. Other configurations are, however, within the scope of the present invention.

The reader 63 typically includes/contains a communications module 73 including at least an RF transmitter and at least one acoustic receiver circuit. Alternatively, the RF transmitter and acoustic receiver circuits can be separate units and/or can be located at the surface. The reader 63 also typically includes at least one, but more typically a pair of acoustic receivers 75, such as, for example, a pair of hydrophones. The acoustic receivers 75 are typically spaced apart in order to selectively "triangulate" the location of each transponder 65 as shown, for example, in FIG. 4, by analyzing differences in the times-of-arrival of a return signal 77 transmitted by the respective transponder 65 in response to a reader interrogation signal 79, as shown, for example, in FIGS. 4 and 5. The reader 63 also includes an antenna assembly 81 including a directional antenna 83 and an antenna motor 85. The reader 63 also includes control, decoder, modulation, and/or power supply means as known to those skilled in the art. Note, although illustrated as two separate acoustic return signals in FIG. 5, one ordinary skill in the art would understand that the illustrated acoustic return signals R1, R2 are as a result of the same signal 77 emanating from transponder 65, but having two different arrival times due to an axial spacing differential between acoustic receivers 75 and the transponder 65 of interest. The different axial spacing between the axial location of each acoustic receiver 75 and the axial location of the transponder 65 results in a different physical distance from the transponder 65 to each acoustic receivers 75, and thus, a corresponding difference in arrival times ($\tau 2$) between the two receivers 75.

The system 30 also includes the reader deployment assembly 61 configured to deploy the reader 63 within the wellbore 27 and to selectively translate the reader RF antenna 83 (and, e.g., hydrophones 75) axially along a main axis of the wellbore 27 and to selectively activate one or more of the plurality of transponders 65 to thereby isolate the respective one or more transponders 65. The reader deployment assembly 61 is also configured to provide a communications link between the reader 63 and surface equipment when operably deployed within the wellbore 27. According to an exemplary configuration, the reader deployment assembly 61 includes an electrically actuated spool 87 containing a deployment cable 89 for providing control and/or data signals between the fracture mapping computer 31 and the onboard reader controller, and for translating the reader 63 along the main axis of the wellbore 27. According to an exemplary configuration, deployment cable 89 can include various forms of communication media as known to one of ordinary skill in the art. Alternatively, wireless communication media can be employed, rendering it unnecessary to have cable 89 include any form of communication media. Further alternatively, the reader 63 can be deployed using other means including, for example, drilling pipe, etc., with or without a direct "cable" communication medium.

According to an exemplary configuration, the fracture mapping computer 31 can function as or take the form of a controller configured in software and/or hardware to perform various operations/control functions to include initiating rotation of the reader RF antenna 83 to selectively activate one or more transponders 65, identifying an approximate center of positive response of each respective transponder 65 responsive to rotation of the antenna 83, and determining an approximate azimuth/bearing of each respective transponder 65, e.g., in relation to a reference point or plane (not shown) associated with the reader 63.

The operations can also or alternatively include analyzing data indicating at least portions of the acoustic signal 77 received by at least one of the acoustic receivers 75, determining an approximate travel time of acoustic signal, and responsively determining an approximate range of the respective emitting transponder 65. Note, range is typically defined as the distance between a reference point or plane and a corresponding point or plane associated with the location of the transponder 65. Note also, in the exemplary configuration, $\tau 1$ encodes the range and $\tau 2$ encodes the azimuth.

The operations can also or alternatively include analyzing data indicating at least portions of an acoustic return signal from the respective transponder 65 received by a first of the pair of acoustic receivers 75, determining an approximate travel time of the acoustic return signal, identifying an approximate range of the respective emitting transponder 65, analyzing data indicating at least portions of the acoustic return signal from the respective emitting transponder 65 received by a second of the pair of acoustic receivers 75, determining an approximate travel time of the acoustic return signal received by the second of the pair of acoustic receivers 75, and identifying the approximate axial location of the respective transponder 65.

The operations can also or alternatively include translating the reader RF antenna 83 and/or reader 63 axially along the main axis of the wellbore 27 to thereby cause actuation of the respective transponder 65 (i.e., via positioning the antenna 83 so that the radiation pattern is within range of the transponder 65), identifying an approximate center of affirmative response of the respective transponder 65 and determining the approximate axial location of each respective transponder 65, for example, with respect to a reference location along the main axis of the wellbore 27.

Note, although described as being implemented by fracture mapping computer 31, one of ordinary skill in the art would recognize that the reader controller function and software components can be distributed or shared between the fracture mapping computer 31, the reader's onboard processor/controller components, or a third dedicated controlling device (not shown).

As shown in FIG. 3, each transponder 65 typically includes a body or substrate 91 containing or carrying a controller circuit module 93 including portions of an RF receiver or transceiver circuit, a demodulation circuit, a power supply circuit, and a digital control or logic circuit. Note, although illustrated as a single module, one of ordinary skill in the art would understand that such circuit or circuits can be implemented together or separately in hardware and/or to some extent in software. The controller circuit module 93 (e.g., portions of the digital control circuit) are operably coupled an RF antenna 95 for receiving command and/or power signals from the reader 63, and an acoustic transmitter 97 for providing an acoustic signal having a sufficient range to reach the reader 63 using onboard power available.

To enhance provision of the acoustic signal, each transponder 63 can be in the form of what is referred to as a battery assisted transponder. Accordingly, such transponders 65 can include an additional onboard power source 99, for example, in the form of a large capacitor or battery, operably coupled to the acoustic transmitter 97 and configured to store energy to provide a power assist to the acoustic transmitter circuit.

According to the exemplary configuration, acoustic transmitters 97 are employed to increase the interrogate-read range of the transponders 65, reducing congestion and increasing range by allowing use of a different communication channel for the return signal having a much larger range capability than an RF transmission from a transponder 65 of the same power capability. According to an embodiment of the present invention, such acoustic signals can traverse kilometers of rock, enabling long range communications with transponders 65 in the subs-surface environment. Note, a transponder having a 30 mm disk shaped antenna and a 23 mm cylindrical transponder were tested using a reader having a 80 mm disk shaped antenna and were found to provide an RF response signal limited to approximately 16 cm.

According to the exemplary implementation, the acoustic transmitters 97 typically comprise one or more acoustic transducers that convert electrical signals into and/or from acoustic energy into rock. Rocks of interest are generally somewhat porous and fluid-filled, either water or oil, but may be filled with gas. As such, exemplary transducers, though similar in function to loudspeakers and microphones, are preferably optimized for operation in fluids or fluid-filled rock. Piezoelectric transducers provide an example of a transducer suitable for miniaturization and low power operation needed for employment of hybrid-RFID transponders 65 to be deployed in hydraulic fractures.

Figure 6:
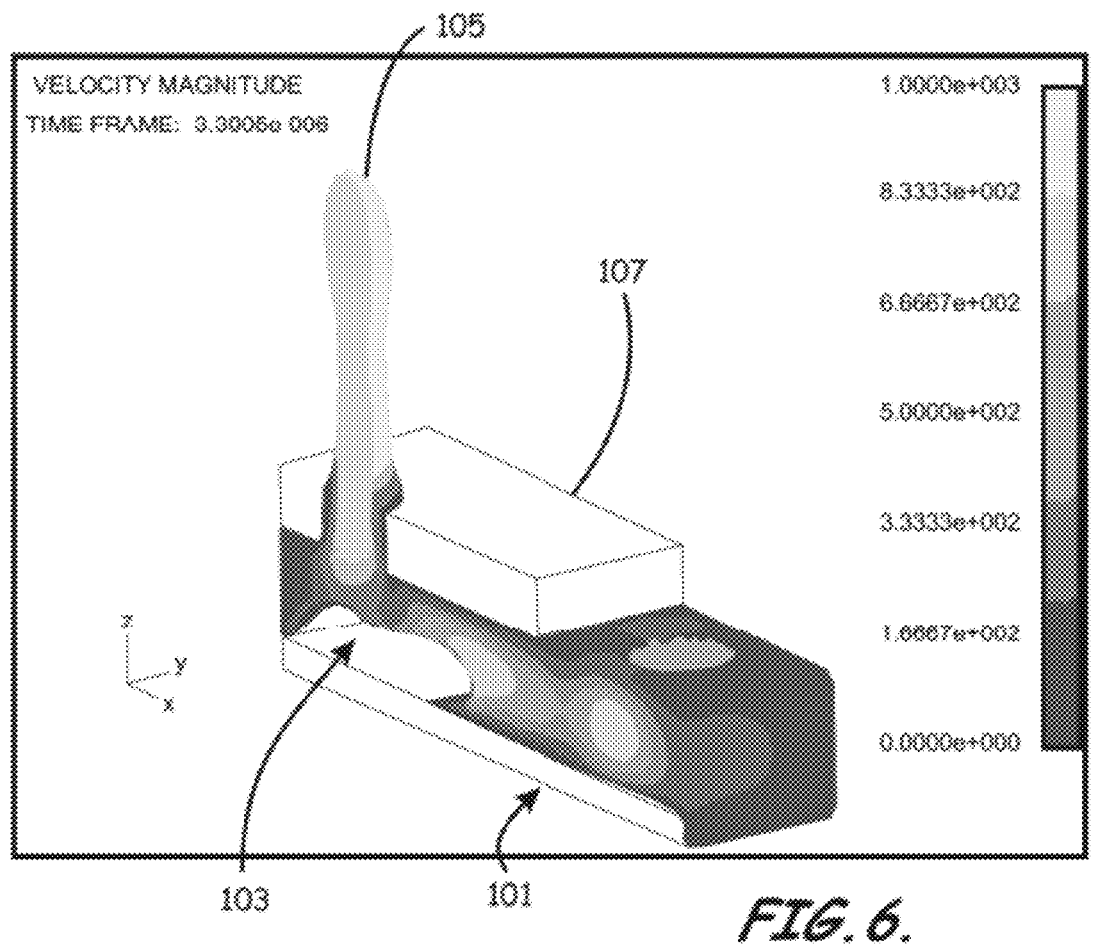
FIG. 6 is a graphical representation of a thermal-acoustic device carried by the hybrid transponder of FIG. 3 according to an embodiment of the present invention.
Figure 7:
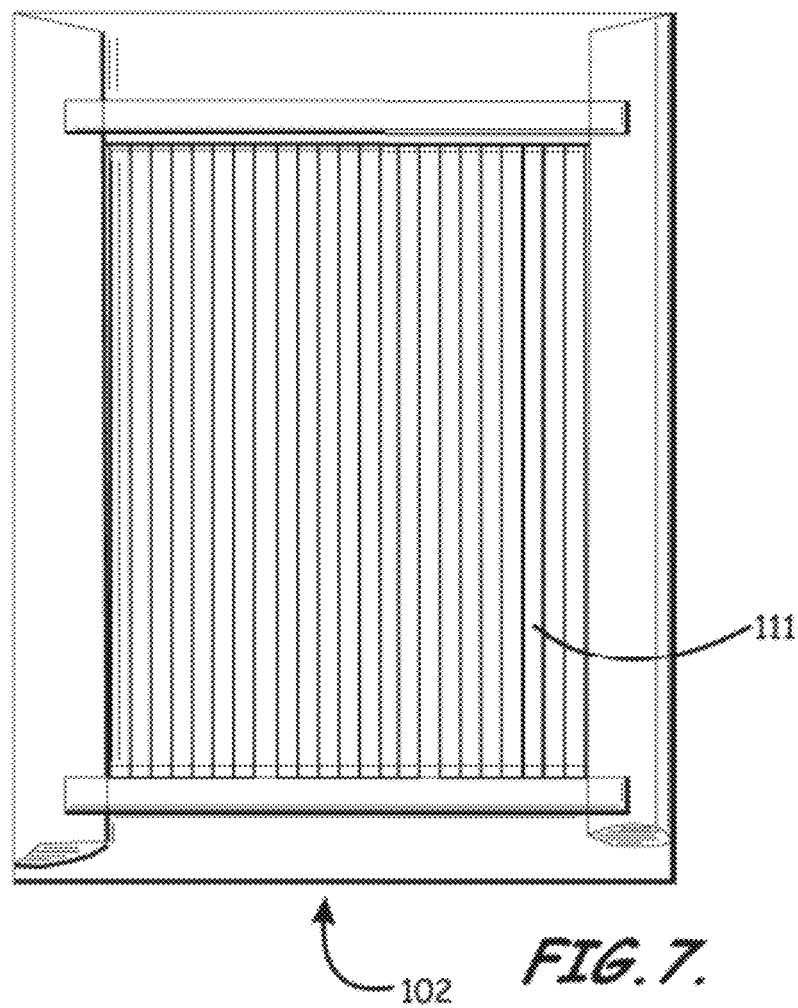
FIG. 7 is a graphical representation of a thermal-acoustic device carried by the hybrid transponder of FIG. 3 according to an embodiment of the present invention.

As shown in FIGS. 6 and 7, respectively, two examples of thermo-acoustic devices that have been determined to be suitable for realizing miniaturized hybrid RFID transponders 65 include "thin film heater-type" and "carbon nanotube membrane-type" devices 101, 102. Both such devices can exploit an electrically driven thermal pulse from a low-mass, low thermal conductivity to rapidly heat a working fluid and generate a pressure wave. The thin film heater-type device 101, for example, can employ a thin film heater 103 to actually boil surrounding fracturing or hydrocarbon fluid to create a high pressure (e.g., >10 MPa) bubble that ejects a drop of fluid 105 from an appropriately shaped vessel 107. Similarly, new carbon nanotubes membranes 111 of the nanotube device 102 are electrically heated to create pressure waves to generate useful acoustic signals.

According to an exemplary configuration, the digital control or logic circuit 93 (see, e.g., FIG. 3) can be configured to receive commands from a reader 63 and to selectively control a state of the transponder 65. The various states of the transponder 65 can include an active state and a quiescent (sleep) state. According to an embodiment of the transponder 65, the digital control circuit 93 is also or alternatively configured to determine a power level of a received command signal and cause the acoustic transmitter 97 to transmit an acoustic return signal 77 when the power level of the interrogation signal 79 received from the reader 63 is at or above a predetermined power level and to enter the quiescent state when the power level of the portion of the signal 79 received from the reader 63 drops to or below a predetermined power level. According to an alternative embodiment, the different states can be controlled via specific commands encoded in the signal 79 received from the reader 63.

According to an embodiment of the present invention, controller circuit module 93 can also include various sensors (not shown) as known to those of ordinary skill in the art configured to measure reservoir parameters in situ, such as, for example, solidity, local dielectric constant, temperature, and pressure. Note, one of ordinary skill in the art would recognize that the sensors can be integral with controller circuit module 93 or positioned on a separate portion of substrate 91.

As noted above, "hybrid-RFID" transponders 65 can be used for mapping hydraulic fractures 21 and reservoir parameters. To do so, however, transponders 65 need to be sized and shaped to be able to physically fit into the fissures 25 of the hydraulic fracture 21. As such, transponders 65 should generally not be more than about one millimeter long in at least one dimension, in order to travel along with reservoir agents/proppant 28 through casing perforations 29 and associated apertures or fissures 25. Ideally, transponders 65 will be round in shape to facilitate transport in the fracture fluid during injection. Transponders 65, however, may have an elongated or planar shape as shown in FIG. 3. If non-spherical, the transponders should be less than about one centimeter in a second dimension to facilitate transport through the casing perforations and the fracture aperture at the wellbore 27. Further, if non-spherical, transponders 65 should further be somewhat flexible to allow transport through non-planar fractures and over rock surfaces, which can be expected to be rough.

In operation, RF fields generated from the reader 63 and directed through rotation of the antenna 83 are used to transmit power and/or instructions to the transponders 65. Responsively, the transponders 65 can automatically generate an acoustic return signal 77 when powered by the RF field and optionally generate the acoustic return signal 77 when instructed to do so by the reader 63. The range and position of a transponder 65 relative to a reader 63 may be determined using triangulation to the acoustic return signal 77 received by the reader 63 as shown, for example, in FIG. 4, by adjusting the RF power transmitted from the reader 63 (RF antenna 83), and/or varying the position or orientation of the reader RF antenna 83. Note, in order to identify specific transponders 65 and to prevent interference with other transponders 65, the acoustic return signal can include a transponder code and/or time delay data indicating that amount of randomly generated or sequentially generated time delay implemented prior to transmit the acoustic return signal 77.

Figure 4:
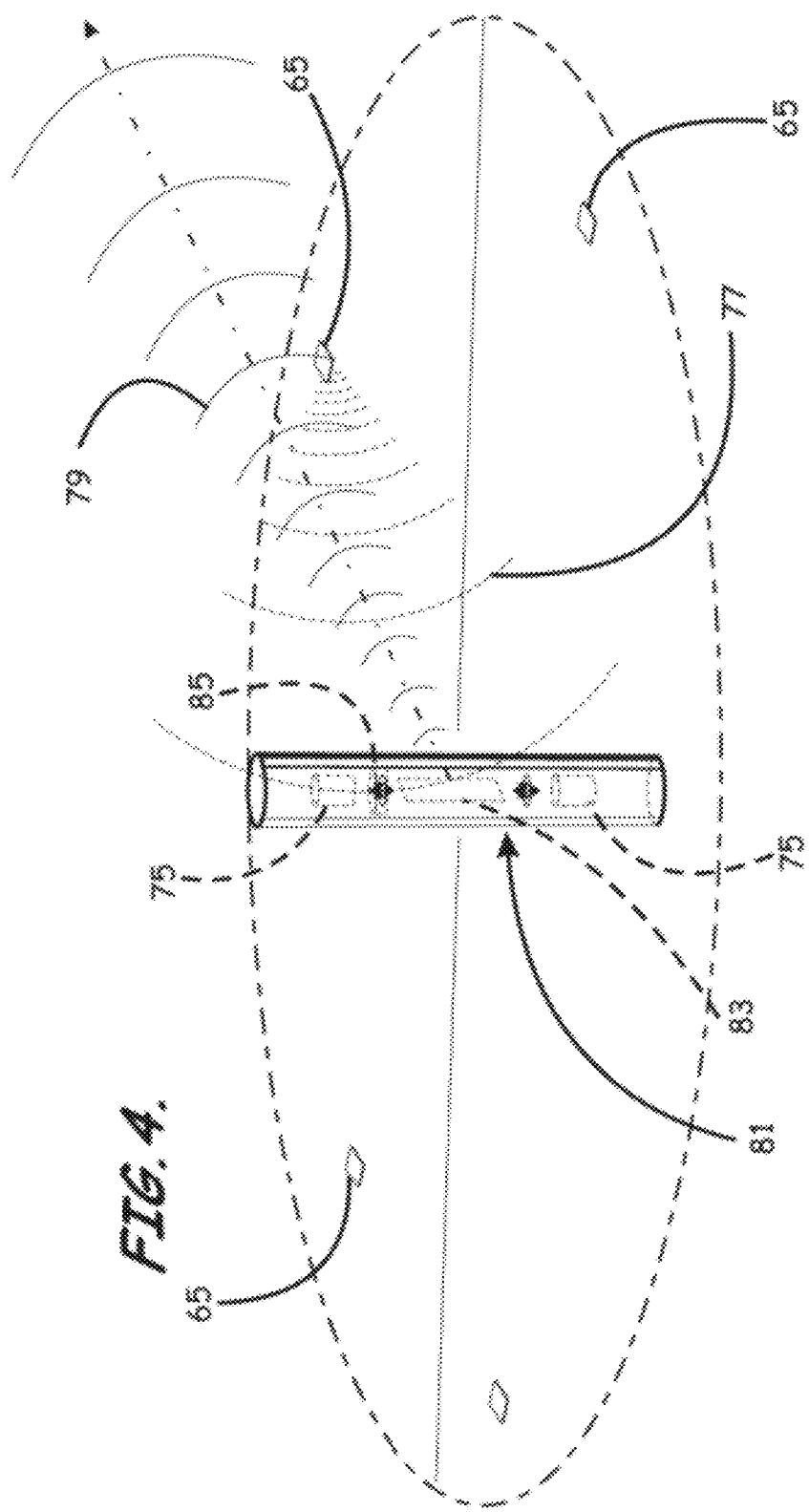
FIG. 4 is an environmental view of the hybrid reader and hybrid transponder of FIGS. 2 and 3 illustrating communications therebetween within the reservoir.
Figure 5:
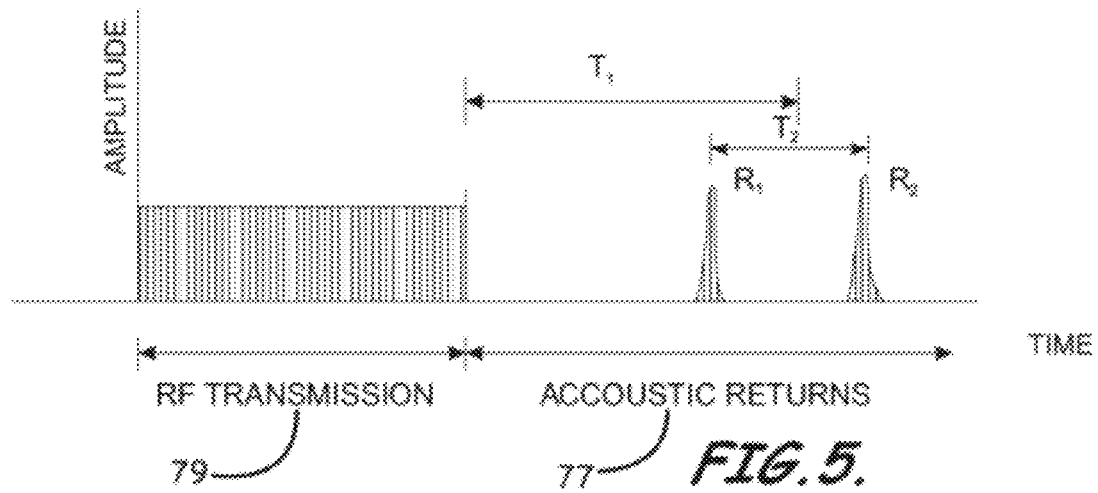
FIG. 5 is a graphical representation of a signal structure including RF transmission and an acoustic return signal according to an embodiment of the present invention.

FIG. 5 illustrates a basic communication signal structure for communication between a single reader 63 and a single transponder 65. As shown in the figure, an RF transmission pulse 79 of predetermined/preselected duration is transmitted by the reader 63. A receiving transponder 65 responsively returns acoustic return signal 77 which can have different arrival times between reader acoustic receivers 75. For example, for the uppermost transponder 65 positioned in relation to reader 63 as shown in FIG. 4, the upper acoustic receiver 75 will receive the acoustic return signal 77 first, providing range data based on the amount of time between RF transmission and acoustic signal return. The lower acoustic receiver 75 will receive the acoustic signal at a later time. The time differential τ2 between arrival time at the upper acoustic receivers 75 and the lower receiver 75 signal can then be used to triangulate the position of the transponder 65.

Figure 8:
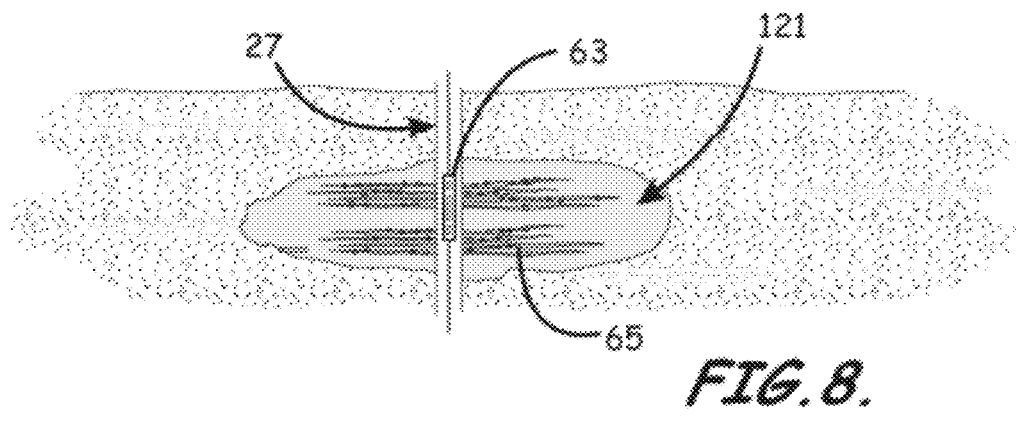
FIG. 8 is a graphical representation of a mesh network communication scheme between transponders according to an embodiment of the present invention.

FIG. 8 illustrates an alternative embodiment whereby the transponders 65 are configured to form a mesh network 121 and to communicate/relay timing data back to the reader 63 so that the reader 63 can utilize the relative position of in-range transponders 65 to further determine the position of out-ofrange transponders 65 that are out of range of the reader 63, but in range with other transponders 65, using similar principles described with respect to reader 63.

Figure 9A:
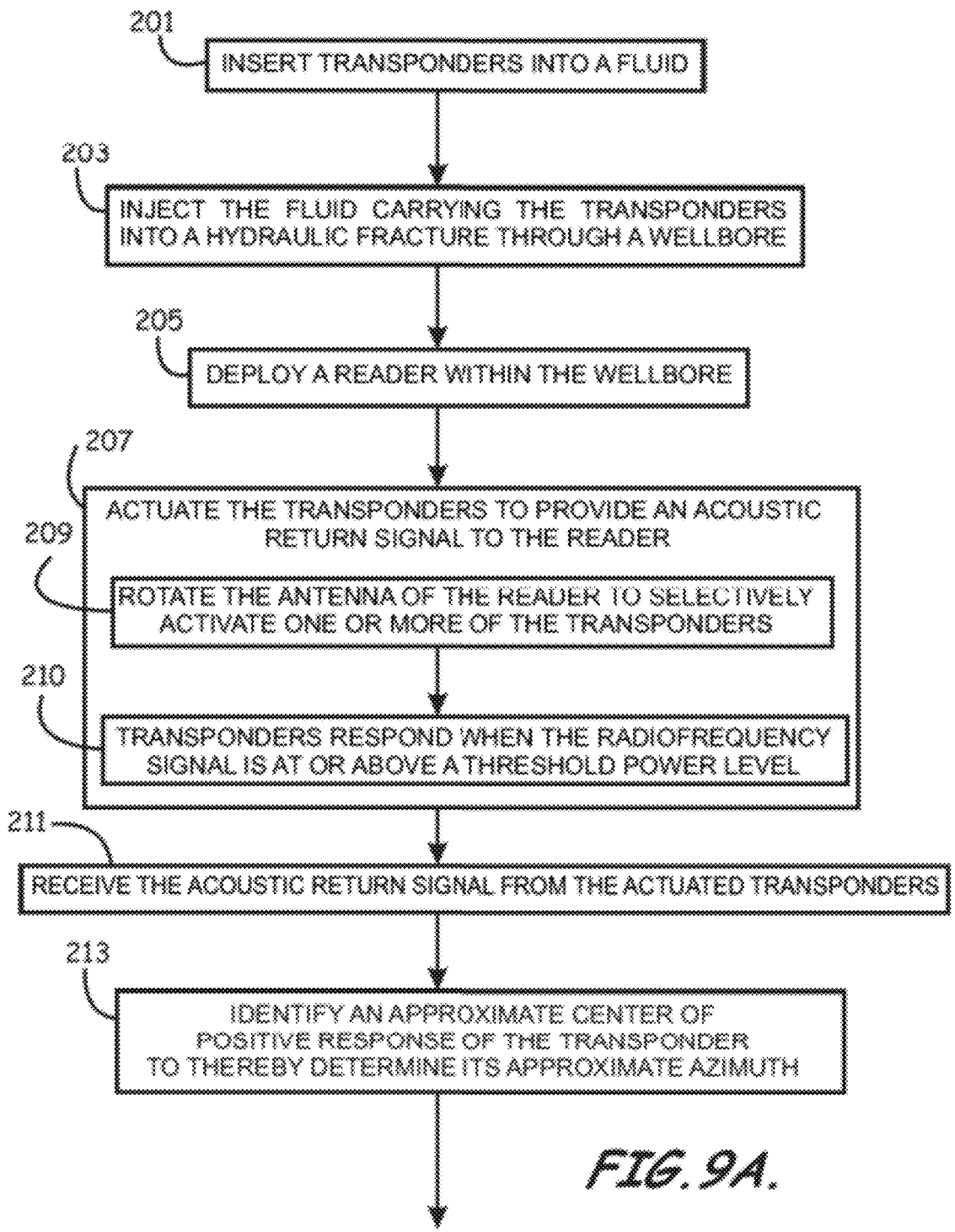

FIGS. 9A-9B provide a high-level flow diagram illustrating various selected operations with respect to the fracture mapping program product 51 and/or associated method steps for determining a size, extent, and orientation of a hydraulic fracture 21 of a reservoir 23 according to an embodiment of the present invention. The steps/operations can include inserting a plurality of transponders 65 into an, e.g., hydraulic fracturing fluid (block 201), injecting the fluid carrying the transponders 65 (and, e.g., proppants 28) into the individual fissures 25 of the hydraulic fracture 21 through one or more casing perforations 29 associated with wellbore 27 (block 203), and deploying within the wellbore 27 a reader 63 specifically dimensioned to be deployed within the wellbore 27 (block 205). The reader 63 can include a communications module 73 containing an RF transmitter and at least one acoustic receiver circuit (see FIG. 2).

The steps/operations can also include the reader 63 selectively actuating each of the transponders 65 to cause them to provide an acoustic return signal to the reader 63 (block 207). According to an exemplary configuration, the antenna 83 of the reader 63 is rotated about an axis approximately parallel with the axis of the wellbore 27 where the reader 63 is located (block 209) to thereby selectively activate a subset of one or more of the transponders 65, with the others located outside the primary portions of the radiation pattern of the antenna 83 remaining unactivated. According to an exemplary configuration, to accomplish the selective activation, each transponder 65 can be set to actuate responsive to receiving portions of the radiofrequency signal 79 at or above a preselected threshold power level (block 210), with a remainder of the transponders 65 receiving the radiofrequency signal 79 at a level below the threshold radiofrequency signal power level remaining unactivated.

As shown in FIG. 4, for example, the acoustic receivers 75 of the reader 63 receive at least portions of the acoustic return signal 77 from the respective transponder 65 when actuated (block 211). By rotating or panning the antenna 83 about its main axis (e.g., parallel with the axis of the wellbore 27), the reader 63 and/or computer 31 can determine the limits of where the antenna 83 fails to provide sufficient energy to the respective transponder 65 to actuate the transponder 65. The approximate center of such positive response from the respective transponder 65 can then be identified, which can provide an approximate azimuth or bearing of the respective transponder 65 (block 213).

In response to receiving the acoustic return signal from a transponder 65, the reader and/or computer 31 can determine or otherwise identify an approximate travel time of the signal to thereby determine an approximate range of each respective transponder 65 (block 215). In order to determine an approximate axial location of the transponder 65 with respect to a reference location along the main axis of the wellbore 27, the antenna 83 of the reader 63 can be translated along the axis of the wellbore 27 normally in short increments adjacent the expected location of the transponders 65 in order (block 217) to identify an approximate center of affirmative response, which approximates the axial location of the respective transponder 65 (block 219).

For readers 63 having two or more spaced apart acoustic receivers 75, the steps/operations can also or alternatively include determining an approximate travel time of portions of the acoustic return signal 77 received by one of the pair of acoustic receivers 75 to thereby identify an approximate range of the respective transponder (block 221), determining an approximate travel time of portions of the acoustic return signal 77 received by the other of the pair of acoustic receivers 75 (block 223), and analyzing a time differential between the approximate travel time of the acoustic return signal to the first and the second of the pair of acoustic receivers 75 to thereby determine the approximate axial location of each respective transponder 65 with respect to a reference location along the main axis of the wellbore 27 (block 225). Note, in this configuration, it is assumed that the acoustic return signal 77 is effectively omnidirectional at least with respect to the acoustic receivers 75, particularly if the acoustic transmitter 97 is fixed in relation to the main body of the transponder 65.

For both exemplary configurations, the range, bearing/azimuth, and axial location provide for the reader 63 and/or computer 31 data sufficient to perform the steps/operations of determining a three-dimensional position of the respective transponder 63 (block 227), mapping (conceptually or literally) the location of each of the transponders 65, and determining an extent and orientation of the hydraulic fracture 21 (block 230).

Figure 10A:
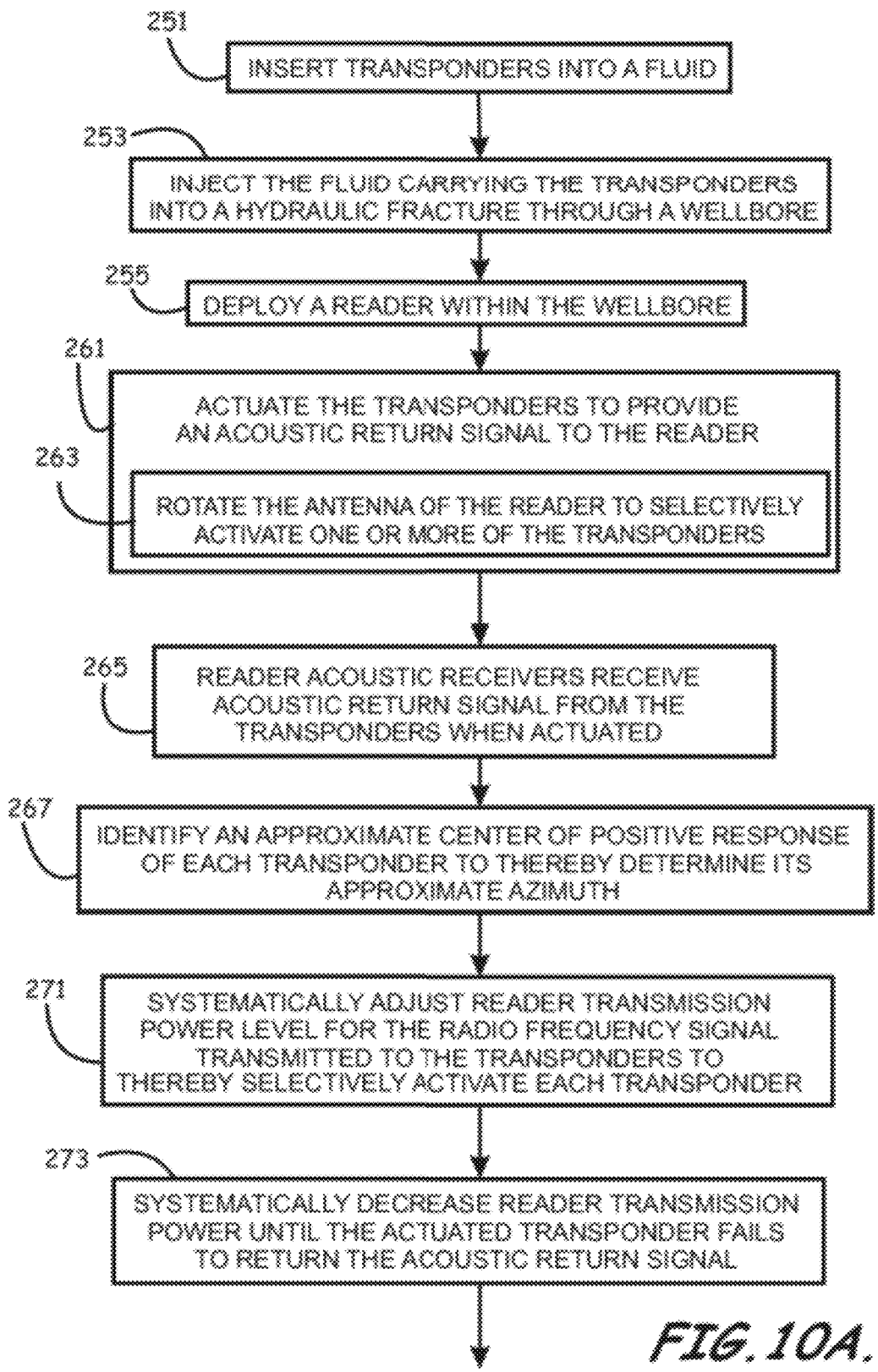
FIGS. 10A-10B is a schematic flow diagram illustrating steps associated with determining a size, extent, and orientation of a hydraulic fracture of a reservoir according to an embodiment of the present invention.
Figure 10B:
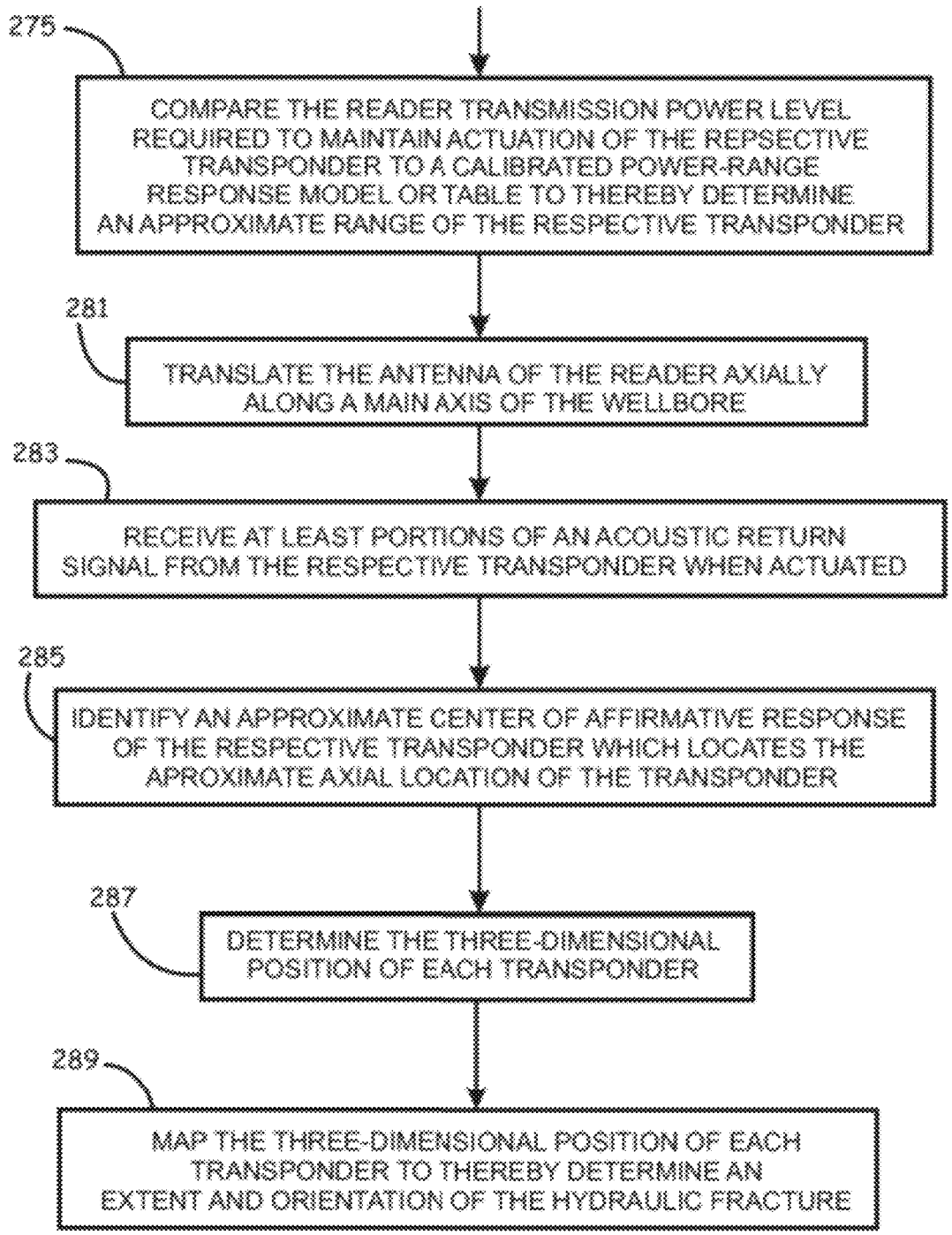

FIGS. 10A-10B provide a high-level flow diagram illustrating various selected operations with respect to the fracture mapping program product 51 and/or associated method steps for determining a size, extent, and orientation of a hydraulic fracture 21 of a reservoir 23 according to another embodiment of the present invention. The steps/operations can also include inserting a plurality of transponders 65 into an, e.g., hydraulic fracturing fluid (block 251), injecting the fluid carrying the transponders 65 into the individual fissures 25 of the hydraulic fracture 21 through a wellbore 27 (block 253), and deploying a reader 63 within the wellbore 27 (block 255).

The steps/operations can also include the reader 63 selectively actuating each of the transponders 65 to cause them to provide an acoustic return signal 77 to the reader 63 (block 261), typically one subset at a time. According to an exemplary configuration, the antenna 83 of the reader 63 is rotated about an axis approximately parallel with the axis of the wellbore 27 where the reader 63 is located (block 263) to selectively activate a subset of one or more of the transponders 65, with the others located outside the primary portions of the radiation pattern of the antenna 83 remaining unactivated. The steps/operations can also include an acoustic receiver 75 of the reader 63 receiving portions of the acoustic return signal 77 from the respective transponder 65 when actuated (block 265). The steps/operations can also include identifying an approximate center of positive response of the respective transponder 65 responsive to rotation/panning of the antenna 83 to thereby determine an approximate azimuth of the respective transponder 65 (block 267).

The steps/operations can also include the reader 63 and/or computer 31 systematically adjusting the reader transmission power level of the radiofrequency signal 79 to thereby selectively activate each respective transponder 65 receiving portions of the radiofrequency signal 79 at or above a threshold radiofrequency signal power level (block 271), with a remainder of the transponders 65 receiving portions of the radiofrequency signal 79 at a level below the threshold radiofrequency signal power level remaining unactivated. The steps/operations can also include systematically decreasing reader transmit power until the respective transponder 65 (after being activated) fails to return the acoustic return signal 77 (block 273), and comparing the reader transmission power level required to maintain actuation of the respective transponder 65 to a previously calibrated power-range response model or table (not shown) to thereby determine an approximate range of the respective transponder 65 (block 275).

The steps/operations can also include deploying or otherwise translating the antenna 83 of the reader 63 axially along a main axis of the wellbore 27 (block 281), and for each of the plurality of transponders 65, performing the steps/operations of receiving at least portions of an acoustic return signal 77 from the respective transponder 65 when actuated (block 283), identifying an approximate center of affirmative response of the respective transponder 65 responsive to translation of the antenna 83 to thereby determine the approximate location of the respective transponder 65 with respect to a reference location along a main axis of the wellbore 27 (block 285). Having determined the range, azimuth, and location for each of the transponders 65 along the wellbore 27, the three-dimensional position of each of the transponders 65 can be determined (block 287). Further, by mapping the location of each transponder 65, the extent and orientation of the hydraulic fracture 21 can further be determined (block 289).

It is important to note that while the foregoing embodiments of the present invention have been described in the context of a fully functional system and process, those skilled in the art will appreciate that the mechanism of at least portions of the present invention and/or aspects thereof are capable of being distributed in the form of a computer readable medium in a variety of forms storing a set of instructions for execution on a processor, processors, or the like, and that embodiments of the present invention apply equally regardless of the particular type of media used to actually carry out the distribution. Examples of the computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, HD-DVDs, memory sticks, mini disks, laser disks, Blu-ray disks, flash drives, and other newer types of memories, and certain types of transmission type media such as, for example, digital and analog communication links capable of storing the set of instructions. Such media can contain, for example, both operating instructions and the operations instructions related to the program product 51, and the computer executable portions of the method steps according to the various embodiments of a method of determining a size, extent, and orientation of a hydraulic fracture 23 of a reservoir 21, described above. Accordingly, an embodiment of the present invention can include a computer readable medium that is readable by a computer, e.g., fracture mapping computer 31 and/or onboard controller of the reader 63, to perform various functions for mapping hydraulic fractures and reservoir parameters.

This application is related to U.S. patent application Ser. No. 13/093,979, filed on Apr. 26, 2011, titled "HYBRID TRANSPONDER SYSTEM FOR LONG-RANGE SENSING AND 3D LOCALIZATION," incorporated by reference in its entirety.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

That claimed is:

1. A method of determining a size, extent, and orientation of a hydraulic fracture of a reservoir, the method comprising the steps of:

injecting a fluid carrying a plurality of transponders into a hydraulic fracture through a wellbore, the fluid injected through casing perforations and at least one fracture aperture;

actuating each of the plurality of transponders by a reader to provide an acoustic return signal to the reader, the plurality of transponders each comprising a radiofrequency (RF) identification circuit including an RF antenna and an acoustic transmitter, the reader comprising an RF antenna to actuate the plurality of transponders, and a pair of spaced apart acoustic receivers, the actuating including selectively activating one or more transponders defining a subset of the plurality of transponders, with a remainder of the plurality of transponders located outside an extent of primary portions of a RF radiation pattern associated with the RF antenna of the reader, remaining unactivated;

receiving at least portions of the acoustic return signal from each respective transponder of the subset of the plurality of transponders, the receiving at least portions of the acoustic return signal performed by each of the pair of spaced apart acoustic receivers responsive to;

determining a three-dimensional position of each of the plurality of transponders responsive to receiving the at least portions of the acoustic return signal by each of the pair of acoustic receivers; and determining characteristics of the hydraulic fracture responsive to the determining the three-dimensional position of each of the plurality of transponders.

2. A method as defined in claim 1, wherein the method further comprises the step of deploying the reader RF antenna into the wellbore adjacent the hydraulic fracture; and wherein the step of actuating each of the plurality of transponders further includes: rotating and actuating the RF antenna of the reader to thereby selectively activate each respective transponder of the subset of the plurality of transponders.

3. A method as defined in claim 2, wherein the RF reader antenna is a directional RF antenna, the method further comprising the step of:

identifying an approximate center of positive response of the respective transponder responsive to rotation of the RF antenna of the reader to thereby determine an approximate azimuth of each respective transponder in the subset of transponders.

4. A method as defined in claim 3, further comprising the step of:

receiving at least portions of the acoustic return signal from each respective transponder of the subset of the plurality of transponders, the receiving at least portions of the acoustic return signal performed by the at least one acoustic receiver; and wherein the step of determining the three-dimensional position of each of the plurality of transponders includes for each respective transponder of the subset of the plurality of transponders: determining an approximate travel time of the at least portions of the acoustic return signal received by the at least one acoustic receiver to thereby identify an approximate range of the respective transponder.

5. A method as defined in claim 4, wherein the step of determining a three-dimensional position of each of the plurality of transponders, further includes the steps of:

translating the RF antenna of the reader axially along a main axis of the wellbore; and identifying an approximate center of affirmative response of the respective transponder responsive to translation of the antenna of the reader to thereby determine the approximate axial location of each respective transponder in the subset of transponders with respect to a reference location along the main axis of the wellbore.

6. A method as defined in claim 2, wherein the step of determining characteristics of the hydraulic fracture responsive to the determining the three-dimensional position of each of the plurality of transponders, includes the steps of:
  mapping the three-dimensional position of each of the plurality of transponders; and
  determining an extent and orientation of the hydraulic fracture responsive to the step of mapping.

7. A method as defined in claim 6, wherein the step of determining the three-dimensional position of each of the plurality of transponders includes performing for each respective transponder of the subset of the plurality of transponders, the steps of:
  determining an approximate travel time of the at least portions of the acoustic return signal received by at least one of the pair of acoustic receivers to thereby identify an approximate range of the respective transponder; and
  determining an approximate travel time of the at least portions of the acoustic return signal received by at least one other of the pair of acoustic receivers to thereby identify the approximate axial location of the respective transponder.

8. A method as defined in claim 7, wherein the step of determining the three-dimensional position of each of the plurality of transponders, further includes performing the step of:
  identifying an approximate center of positive response of the respective transponder responsive to rotation of the antenna of the reader to thereby determine the approximate azimuth of each respective transponder in the subset of transponders.

9. A method as defined in claim 1,
  wherein the step of actuating each of the plurality of transponders includes: each of the plurality of transponders receiving an actuation signal transmitted by the reader over a first type of communication channel and responding to the actuation signal over a second type of communication channel being different than the first type of communication channel, the second type of channel comprising an acoustic channel; and
  wherein a direct signal communication range capability between the reader and each of the plurality of transponders and a direct signal communication range capability between each of the plurality of transponders and the reader each substantially exceed 30 meters to provide for determining the three dimensional position of transponders that have traveled to outer limits of the fracture.

10. A method as defined in claim 1, wherein the step of selectively activating the subset of the plurality of transponders, further includes:
  selectively activating the subset of the plurality of transponders based upon their respective physical deployed stationary location within the reservoir.

11. A method as defined in claim 10, wherein the reader further comprises an RF transmitter, and wherein the step of selectively activating the subset of the plurality of transponders based upon their physical deployed stationary location includes:
  systematically adjusting a rotational position of the reader RF antenna to selectively direct energy to each transponder in the subset of the plurality of transponders to thereby determine an approximate azimuth of each respective transponder in the subset of transponders.

12. A method as defined in claim 10, wherein the reader further comprises an RF transmitter, and wherein the step of selectively activating a subset of the plurality of transponders based upon their physical deployed stationary location includes:
  systematically adjusting an axial position of the reader RF antenna along a main axis of the wellbore to selectively direct energy to each transponder in the subset of the plurality of transponders to thereby determine an approximate axial location of each respective transponder in the subset of transponders with respect to a reference location along the main axis of the wellbore.

13. A method as defined in claim 10, wherein the reader further comprises an RF transmitter, and wherein the step of selectively activating a subset of the plurality of transponders based upon their physical deployed stationary location further includes:
  transmitting an RF actuation signal; and
  varying an amount of power transmitted by the reader to selectively direct energy above and below a threshold value to each transponder in the subset of the plurality of transponders to thereby determine an approximate range of each respective transponder in the subset of transponders.

14. A method as defined in claim 1,
  wherein the step of actuating each of the plurality of transponders includes transmitting an RF actuation signal to each of the plurality of transponders;
  wherein the step of determining a three-dimensional position of each of the plurality of transponders includes determining an arrival time of a returned acoustic signal at each acoustic receiver of the pair of reader acoustic receivers, for each separate one of the plurality of transponders; and
  wherein the step of determining characteristics of the hydraulic fracture includes mapping the three-dimensional position of each of the plurality of transponders, and determining an extent and orientation of the hydraulic fracture responsive thereto.

15. A method of determining a size, extent, and orientation of a hydraulic fracture of a reservoir, the method comprising the steps of:
  injecting a fluid carrying a plurality of transponders into a hydraulic fracture through a wellbore, the fluid injected through casing perforations and at least one fracture aperture;
  deploying a reader into the wellbore adjacent the hydraulic fracture;
  actuating each of the plurality of transponders by the reader to provide an acoustic return signal to the reader, to include:
    rotating and actuating an RF antenna of the reader to selectively activate one or more transponders defining a subset of the plurality of transponders, with a remainder of the plurality of transponders located outside an extent of primary portions of a corresponding RF radiation pattern remaining unactivated;
    systematically adjusting a reader transmission power level of a radiofrequency signal transmitted to the one or more transponders defining the subset of the plurality of transponders to thereby selectively activate each respective transponder in the subset of transponders receiving the radiofrequency signal at a threshold radiofrequency signal power level, and each respective transponder of the subset of transponders actuating responsive to receiving the radiofrequency signal at or above the threshold power level, with a remainder of the plurality of transponders receiving the radiofrequency signal at a level below the threshold radiofrequency signal power level remaining unactivated;

wherein the step of determining a three-dimensional position of each of the plurality of transponders, to include:

comparing the reader transmission power level required to maintain actuation of the respective transponder to a calibrated power-range response model or table to thereby determine a range of the respective transponder, and identifying an approximate center of positive response of the respective transponder responsive to rotation of the antenna of the reader to thereby determine the approximate azimuth of each respective transponder in the subset of transponders; and determining characteristics of the hydraulic fracture responsive to the determining the three-dimensional position of each of the plurality of transponders.

16. A method as defined in claim 15, wherein the step of determining the three-dimensional position of each of the plurality of transponders, further includes performing the steps of:

translating the RF antenna of the reader axially along a main axis of the wellbore; and identifying an approximate center of affirmative response of the respective transponder responsive to translation of the RF antenna of the reader to thereby determine the approximate azimuth of each respective transponder in the subset of transponders with respect to a reference location along the main axis of the wellbore.

17. A method of determining a size, extent, and orientation of a hydraulic fracture of a reservoir, the method comprising the steps of:

inserting a plurality of transponders into a fluid, each of the plurality of transponders comprising a passive radiofrequency identification circuit including:

an RF antenna configured to receive a radiofrequency (RF) signal or signals defining a command RF signal, and an acoustic transmitter configured to transmit one or more acoustic signals defining an acoustic return signal;

injecting the fluid carrying the plurality of transponders into a hydraulic fracture through a wellbore, the fluid injected through casing perforations and at least one fracture aperture;

deploying a reader within the wellbore, the reader dimensioned to be deployed within the wellbore and comprising: an RF transmitter operably coupled to an RF antenna and configured to transmit the command RF signal and at least one acoustic receiver configured to receive acoustic return signals;

actuating each of the plurality of transponders by the reader to provide an acoustic return signal to the reader, the actuating including selectively actuating each of a plurality of different subsets of the plurality of transponders by the reader, comprising the steps of:

selectively activating one or more transponders defining one of the subsets of the plurality of transponders, with a remainder of the plurality of transponders located outside an extent of primary portions of a corresponding radiation pattern remaining unactivated, the step of activating including:

transmitting the command RF signal, and rotating the RF antenna of the reader, receiving at least portions of an acoustic return signal transmitted from each transponder of the one or more transponders in response to receiving and being activated by at least portions of the RF command signal, identifying an approximate center of positive response for each transponder of the one or more transponders responsive to the rotating the antenna of the reader and the receiving of respective at least portions of an acoustic return signal transmitted therefrom, determining an approximate azimuth of each of the one or more of the plurality of transponders, repeating performing the steps of rotating the RF antenna of the reader, receiving at least portions of an acoustic return signal, and identifying an approximate center of positive response for each of the one or more transponders of each other subset of transponders until determining the approximate azimuth for each of the plurality of transponders;

determining a three-dimensional position of each of the plurality of transponders responsive to determining the approximate azimuth of each of the plurality of transponders; and determining characteristics of the hydraulic fracture responsive to the determining of the three-dimensional position of each of the plurality of transponders.

18. A method as defined in claim 17, wherein the passive radiofrequency identification circuit further includes a control circuit operably coupled to the RF antenna and to the acoustic transmitter and configured: to receive the command RF signal through the RF receiver antenna, and to selectively control a state of the acoustic transmitter of the respective transponder in response thereto; and wherein the method further comprises performing, by each transponder of the plurality of transponders, the steps of:

receiving the command RF signal through the RF receiver antenna of the respective transponder;

determining a power level of the received command RF signal; and selectively controlling a state of the acoustic transmitter of the respective transponder in response thereto, thereby causing the respective acoustic transmitter to transmit a respective acoustic return signal when the power level of the received command signal is at or above a predetermined power level.

19. A method as defined in claim 17, further comprising the steps of:

identifying an approximate travel time of the at least portions of the acoustic return signal received by the one of at least one acoustic receivers to thereby determine an approximate range of each respective transponder;

translating the RF antenna and the at least one acoustic receiver of the reader axially along a main axis of the wellbore to thereby cause actuation of the respective transponder; and identifying an approximate center of affirmative response for each of the one or more of the plurality of transponders responsive to translation of the RF antenna of the reader and responsive to the receiving the respective acoustic return signal; and determining an approximate axial location of each respective transponder in the subset of transponders with respect to a reference location along the main axis of the wellbore;

wherein the step of determining characteristics of the hydraulic fracture responsive to the determining of the three-dimensional position of each of the plurality of transponders, includes the steps of:
mapping the three-dimensional position of each of the plurality of transponders, and
determining an extent and orientation of the hydraulic fracture responsive to the step of mapping.

20. A method as defined in claim 17,
wherein the at least one acoustic receiver comprises a pair of spaced apart acoustic receivers;
step of receiving at least portions of the acoustic return signal transmitted from each transponder of the one or more transponders defining one of the subsets of the plurality of transponders, includes receiving at least portions of the acoustic return signal from each respective transponder of the respective subset of the plurality of transponders, the receiving at least portions of the acoustic return signal performed by each of the pair of acoustic receivers;
wherein the method further comprises performing for each respective transponder of the subset of the plurality of transponders, the steps of:
a first of the pair of acoustic receivers at a first time-of-arrival, referenced to an RF transmission reference,
determining an approximate travel time of the at least portions of the acoustic return signal received by a second of the pair of acoustic receivers at a second time-of-arrival, referenced to RF transmission reference, and
analyzing a time differential between the approximate travel time of the acoustic return signal to the first and the second of the pair of acoustic receivers; and
determine determining an approximate axial location of the respective transponder with respect to a reference location of the reader along the main axis of the wellbore; and
wherein the step of determining characteristics of the hydraulic fracture responsive to the determining of the three-dimensional position of each of the plurality of transponders, includes the steps of:
mapping the three-dimensional position of each of the plurality of transponders, and
determining an extent and orientation of the hydraulic fracture responsive to the step of mapping.

21. A method as defined in claim 17,
wherein the step of actuating each of the plurality of transponders further includes:
systematically adjusting a reader transmission power level of a radiofrequency signal transmitted to the one or more transponders defining the subset of the plurality of transponders to thereby selectively activate each respective transponder in the subset of transponders receiving the radiofrequency signal at a threshold radiofrequency signal power level, and
each respective transponder of the subset of transponders actuating responsive to receiving the radiofrequency signal at or above the threshold power level, with a remainder of the plurality of transponders receiving the radiofrequency signal at a level below the threshold radiofrequency signal power level remaining unactivated;
wherein the method further comprises the steps of:
comparing the reader transmission power level required to maintain actuation of the respective transponder to a calibrated power-range response model or table to thereby determine a range of the respective transponder,
translating the antenna of the reader axially along a main axis of the wellbore, and
identifying an approximate center of affirmative response of the respective transponder responsive to translation of the antenna of the reader; and
determine determining the approximate axial location of each respective transponder in the subset of transponders with respect to a reference location along the main axis of the wellbore.

22. A method as defined in claim 21,
wherein the at least one acoustic receiver comprises a single acoustic receiver employed to receive the respective return signal from each of the plurality of transponders; and
wherein the step of determining characteristics of the hydraulic fracture responsive to the determining of the three-dimensional position of each of the plurality of transponders, includes the steps of:
mapping the three-dimensional position of each of the plurality of transponders, and
determining an extent and orientation of the hydraulic fracture responsive to the step of mapping.

23. A method of determining a size, extent, and orientation of a hydraulic fracture of a reservoir, the method comprising the steps of:
inserting a plurality of transponders into a fluid, each of the plurality of transponders comprising a passive radiofrequency identification circuit including an RF antenna and an acoustic transmitter;
injecting the fluid carrying the plurality of transponders into a hydraulic fracture through a wellbore, the fluid injected through casing perforations and at least one fracture aperture;
deploying a reader within the wellbore, the reader dimensioned to be deployed within the wellbore and comprising an RF transmitter and at least one acoustic receiver;
actuating each of the plurality of transponders by a reader to provide an acoustic return signal to the reader, the actuating including selectively actuating each of a plurality of different subsets of the plurality of transponders by the reader to include:
rotating the antenna of the reader to selectively activate one or more transponders defining a subset of the plurality of different subsets of the plurality of transponders, with a remainder of the plurality of transponders located outside an extent of primary portions of a corresponding rotating radiation pattern remaining unactivated,
each respective transponder of the subset of transponders actuating responsive to receiving the radiofrequency signal at or above a threshold radiofrequency signal power level, with a remainder of the plurality of transponders receiving the radiofrequency signal at a level below the threshold radiofrequency signal power level remaining unactivated;
for each of the plurality of transponders:
receiving at least portions of an acoustic return signal from the respective transponder when actuated,
identifying an approximate center of positive response of the respective transponder responsive to rotation of the antenna of the reader to thereby determine an approximate azimuth of the respective transponder,
systematically adjusting reader transmission power level of the radiofrequency signal being transmitted to thereby selectively activate the respective transponder when receiving the radiofrequency signal at or above the threshold radiofrequency signal power level, and comparing the reader transmission power level required to maintain actuation of the respective transponder to a calibrated power-range response model or table to thereby determine an approximate range of the respective transponder;

translating the antenna of the reader axially along a main axis of the wellbore;

for each of the plurality of transponders:
  actuating the respective transponder to provide an acoustic return signal to the reader,
  receiving at least portions of the acoustic return signal from the respective transponder when actuated,
  identifying an approximate center of affirmative response of the respective transponder responsive to translation of the antenna of the reader to thereby determine the approximate location of the respective transponder with respect to a reference location along a main axis of the wellbore, and
  determining a three-dimensional position of the respective transponder responsive to identification of the approximate azimuth, range, and axial location of the respective transponder; and determining an extent and orientation of the hydraulic fracture responsive to the determining the three-dimensional position of each of the plurality of transponders.

24. A method as defined in claim 23, further comprising performing for each separate one of the plurality of transponders, the steps of:
  decreasing reader transmit power until the respective transponder after actuation thereof fails to return the respective acoustic return signal;
  identifying the reader transmit power level where the respective transponder first fails to return the respective acoustic return signal; and
  determining approximate range of the respective transponder using a previously calibrated power-range response table.

25. A method as defined in claim 23, wherein a direct signal communication range capability between the reader and each of the plurality of transponders and a direct signal communication range capability between each of the plurality of transponders and the reader each substantially exceed 30 meters to provide for determining the three dimensional position of transponders that have traveled to outer limits of the fracture.

* * * * *